United States Patent [19]

Kato

[11] 4,456,341
[45] Jun. 26, 1984

[54] ZOOM OBJECTIVE

[75] Inventor: Masatake Kato, Tokyo, Japan

[73] Assignee: Canon Kabushiki Kaisha, Tokyo, Japan

[21] Appl. No.: 347,195

[22] Filed: Feb. 9, 1982

[30] Foreign Application Priority Data

Feb. 16, 1981 [JP] Japan .................................. 56-21131

[51] Int. Cl.³ .......................... G02B 9/64; G02B 15/18
[52] U.S. Cl. ...................................... 350/427; 350/423
[58] Field of Search ................................ 350/423, 427

[56] References Cited

U.S. PATENT DOCUMENTS 4,368,954 1/1983 Tsuji ..................................... 350/427
4,380,377 4/1983 Sato et al. ............................ 350/427

Primary Examiner—John K. Corbin
Assistant Examiner—Rebecca D. Gass
Attorney, Agent, or Firm—Toren, McGeady and Stanger

[57] ABSTRACT

A telephoto zoom objective having, from front to rear, a varifocal part and a fixed part, the aforesaid varifocal part having a 1st group of positive power movable for focusing, a 2nd group of negative power movable for varying the image magnification and a 3rd group of positive power movable for compensating for the image shift resulting by the variation of the image magnification. The fixed part has a 4th group of positive power consisting of two positive lenses of strong convex curvature towards the front and a negative lens, and a 5th group of negative power consisting of a negative meniscus lens of convex curvature toward the rear and a positive lens, wherein the aforesaid lenses of the 4th and 5th groups are given predetermined conditions to achieve good correction of aberrations.

2 Claims, 80 Drawing Figures

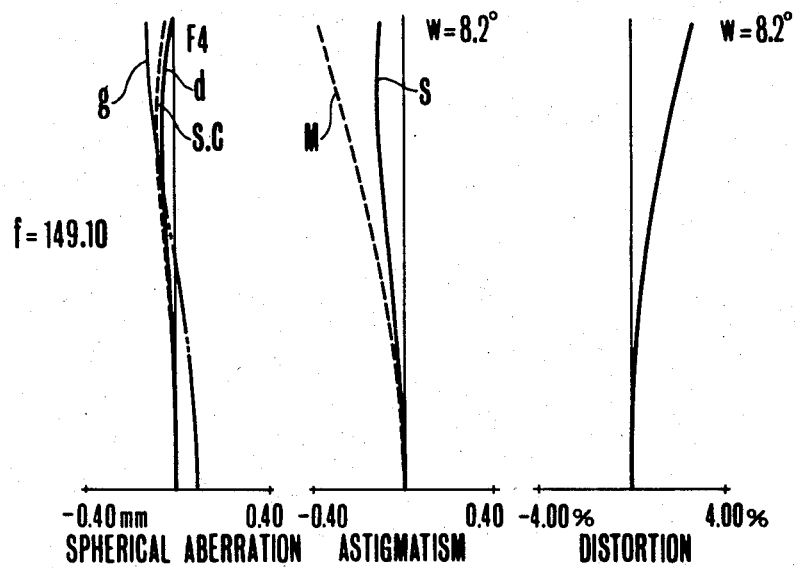
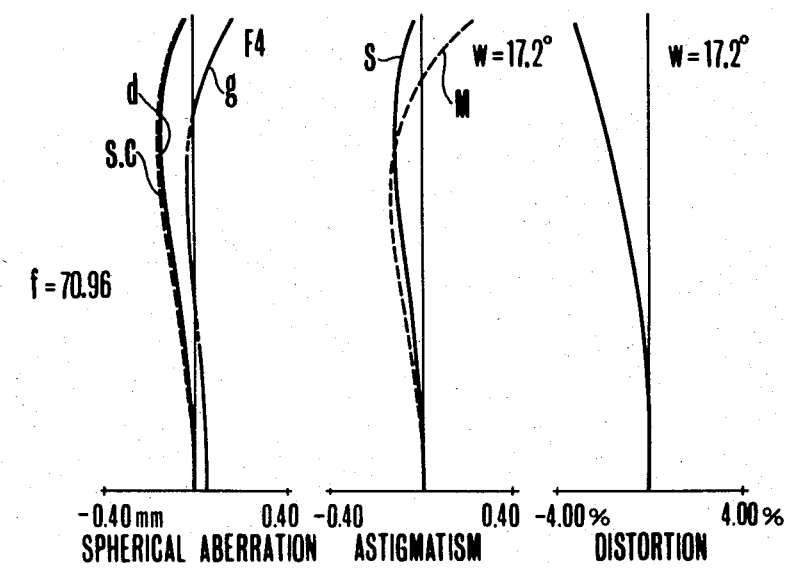

ZOOM OBJECTIVE

BACKGROUND OF THE INVENTION

1. Field of the Invention

This invention relates to zoom objectives and, more particularly, to zoom objectives of telephoto design with the range including long focal lengths.

2. Description of the Prior Art

In the past, zoom objectives of the type constructed from two parts, from front to rear, the varifocal part consisting of three lens groups of positive, negative and positive powers respectively, and the fixed parts consisting of two lens groups have become well known. Examples of such zoom objectives are shown, in U.S. Pat. Nos. 4,189,213, 4,192,577 and 4,223,981. The three lens groups constituting the varifocal part take the form of a 1st group counting from the front having the focusing function, a 2nd group having the magnification changing function and a 3rd group having the image shift compensating function. The fixed part has the function of focusing the object image bearing light beam from the varifocal part at a predetermined point of position. It is noted that there is another method of compensating for the image shift by using the 1st or focusing group in stead of the 3rd group.

In general, in the above-described type zoom lens design, in order to achieve greater compactness of the zoom objective by reducing the physical length and the diameter of the front lens members, it is advantageous to increase the refractive power of the 2nd group with the decrease in the total movement of the 2nd group. This contributes to a shortening of the total length of the entire lens system another consideration involved constructing the fixed part in the form of a telephoto type lens system, thus shortening the physical length of the fixed part. However, the increase of the refractive power of the 2nd group simultaneously requires that the refractive powers of the 1st and 3rd groups be increased with the sacrifice of good aberration correction, as the range of variation with zooming of the spherical aberration is increased, and gool stability of image aberration correction over the focusing range becomes difficult to achieve. This is because the load of refractive power on each of the lens surfaces in the 2nd group becomes heavy, and the resultant lens surfaces produces various aberrations which cannot be balanced out in the varifocal part.

On the other hand, when the refractive power of the 2nd group is weakened, the telephoto ratio of the fixed part must be decreased, or otherwise the advance in the compactness of the zoom objective would be failed. As a result, the Petzval sum amounts to a large negative value, and it becomes difficult to achieve good correction of aberrations.

It is preferred from the aberration correction standpoint that the 4th and 5th groups in the fixed part each be constructed with the inclusion of a positive lens and a negative lens. For the small telephoto ratio, however, the refractive power of the 4th group has to be strengthened. The introduction of the negative lens into the 4th group leads to a corresponding increase of the power of the positive lens. Therefore, the radius of curvature of the surfaces of the positive lens must be made smaller which in turn causes production of higher order aberrations and particularly spherical aberration.

The spherical aberrations of higher order can be usually corrected by the negative lens of the 5th group, but such correction of the higher order aberrations tends to largely affect the other various aberrations. Thus, general good correction of all aberrations becomes very difficult to achieve.

Further, in the lens making art, a problem arises wherein the tolerances within which a complete objective is assembled from its constituent elements and particularly the optical decentering tolerance become severer.

SUMMARY OF THE INVENTION

The present invention relates to the above-described type of zoom objective, that is, zoom objectives of the type constructed from two parts of which the front or varifocal part consists of three lens groups of positive, negative and positive powers in this order from the front, and the rear or fixed part consists of two lens groups, and has for its object to provide a zoom objective which employs so suitable a power distribution over the fixed part and of which each lens is configured to so proper a shape, that the tolerances for lens parameters within which the lens parts may be manufactured and assembled economically are moderated, and the bulk and size of the complete objective is reduced, while still permitting good correction of aberrations.

BRIEF DESCRIPTION OF THE DRAWINGS

FIGS. 9a–9i to 16a–16i are graphic representations of the various aberrations of the objectives of FIGS. 1 to 8 respectively.

DETAILED DESCRIPTION OF THE PREFERRED EMBODIMENT

Figure 1:
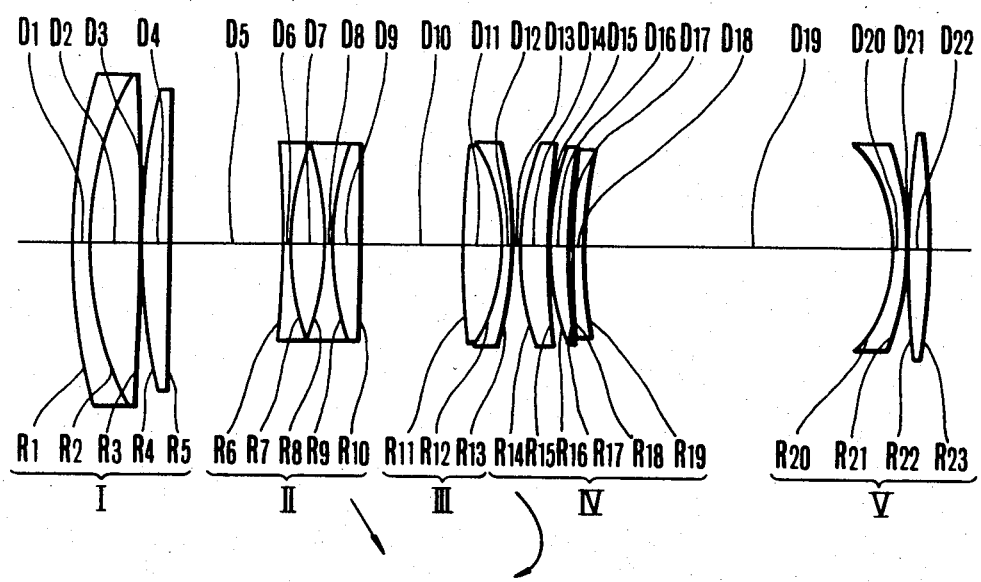
FIGS. 1 to 8 are lens block diagrams of Examples 1 to 8 of embodiments of the invention respectively.
Figure 2:
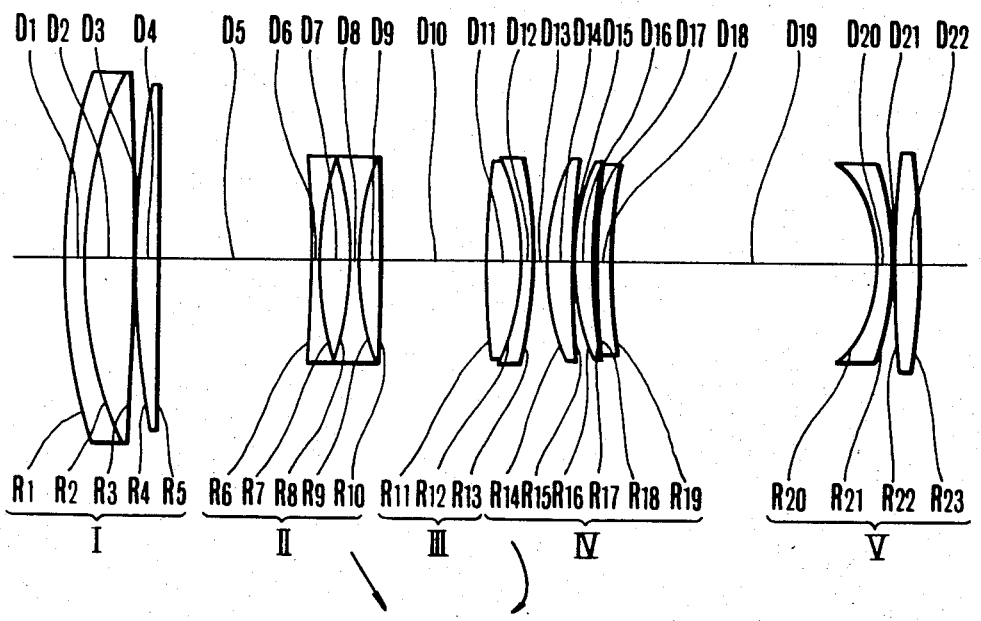
Figure 3:
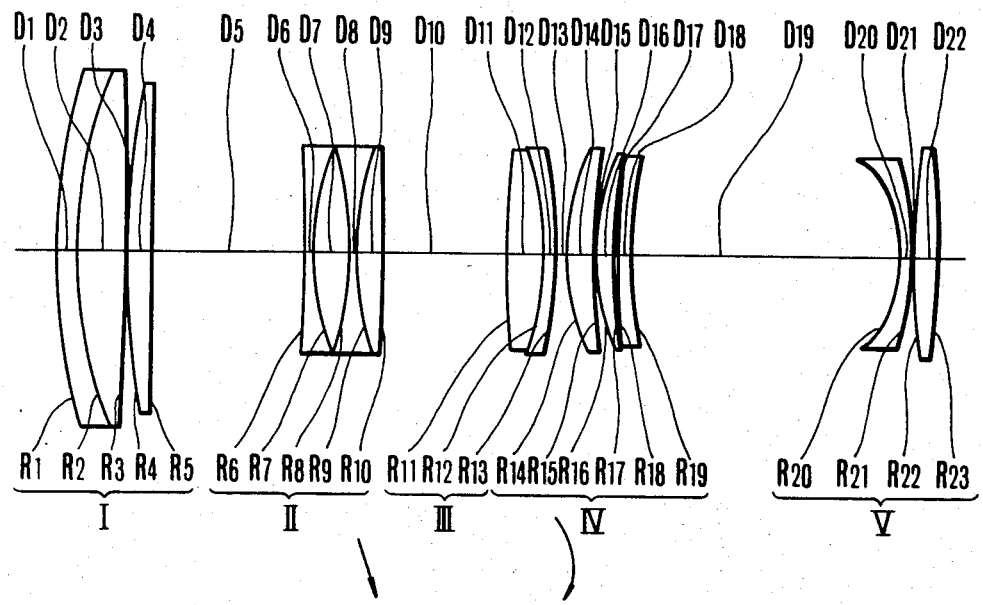
Figure 4:
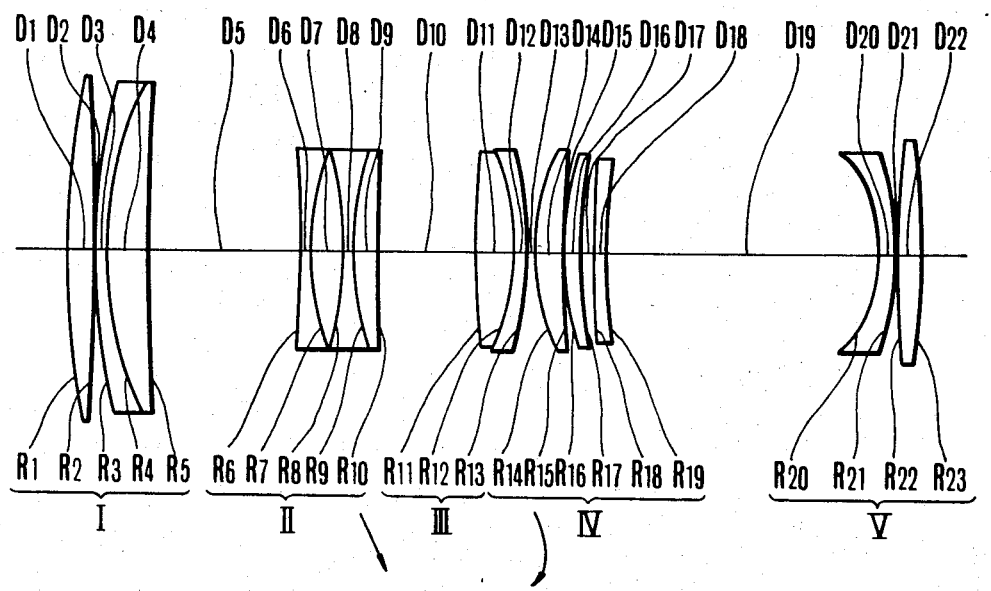
Figure 5:
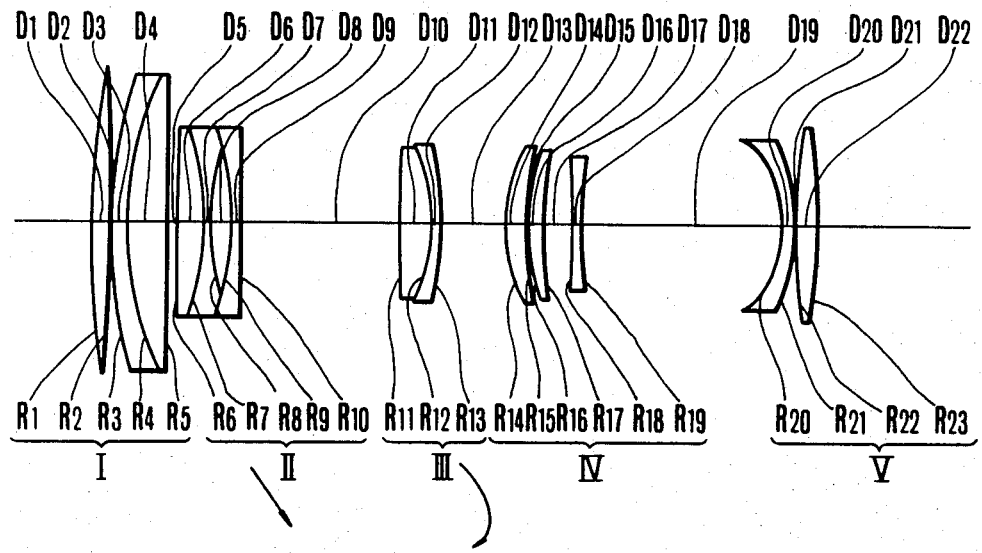
Figure 6:
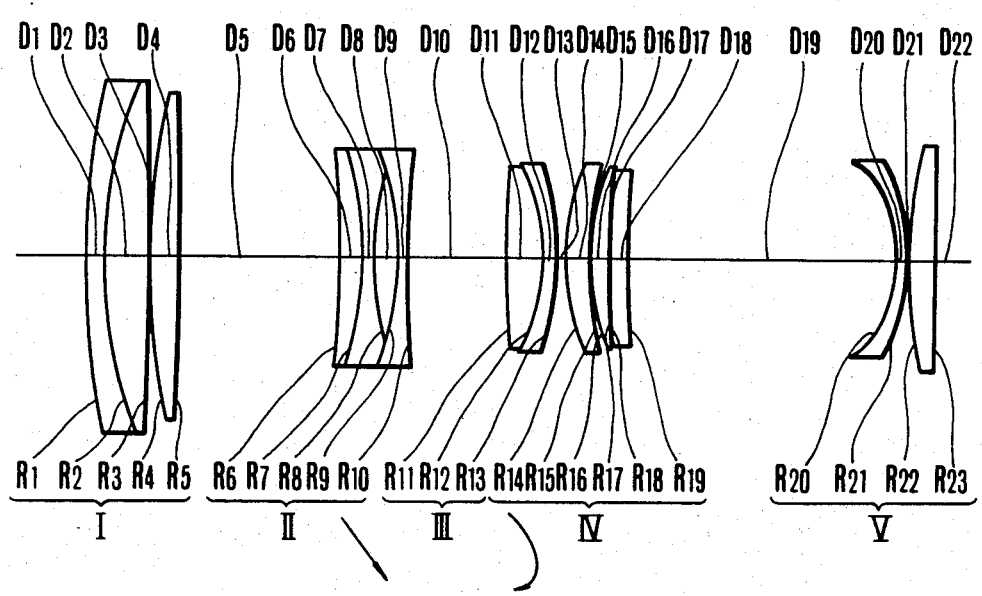
Figure 7:
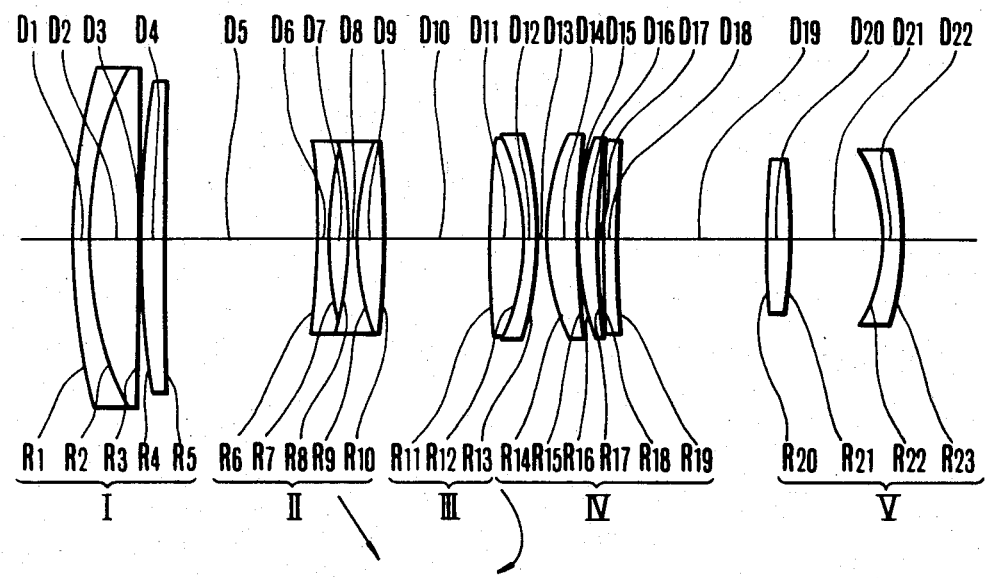
Figure 8:
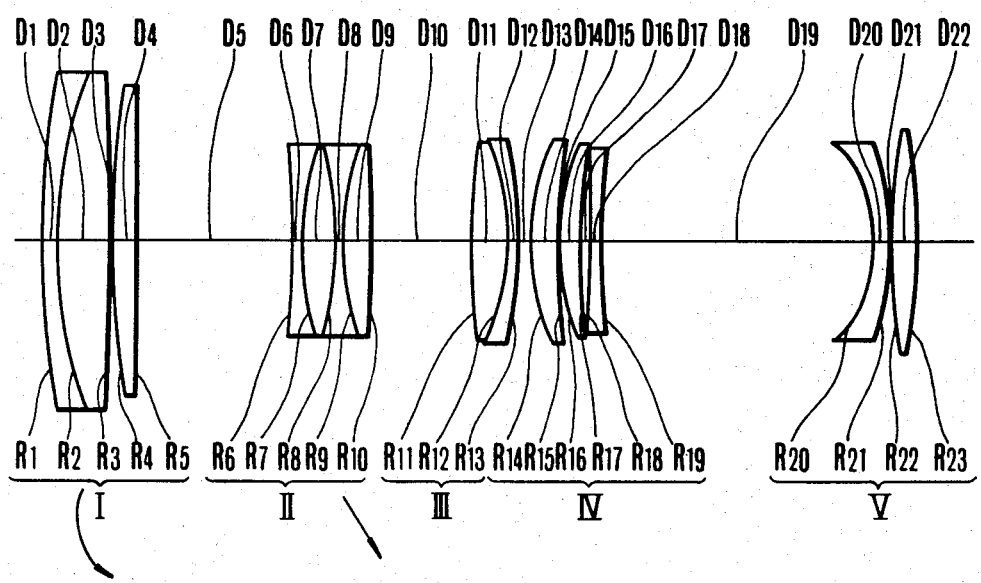
Figures 9A, 9B, 9C:
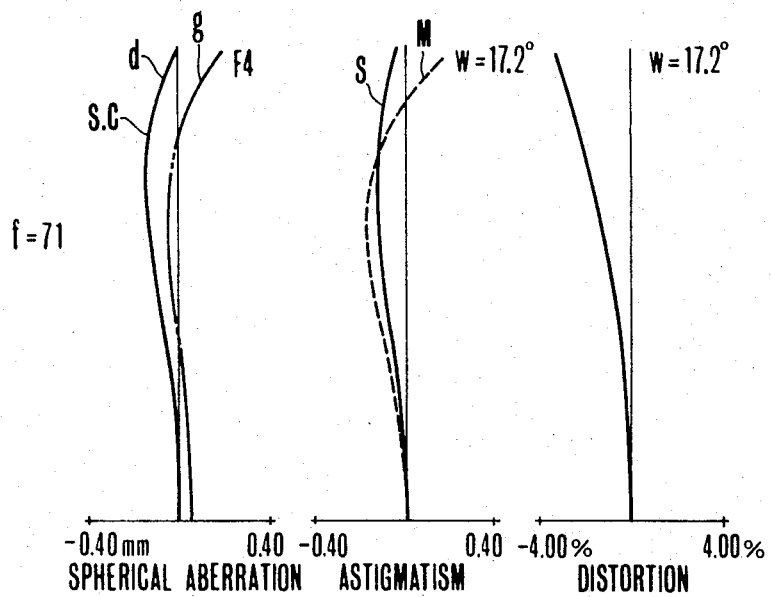
Figures 9D, 9E, 9F:
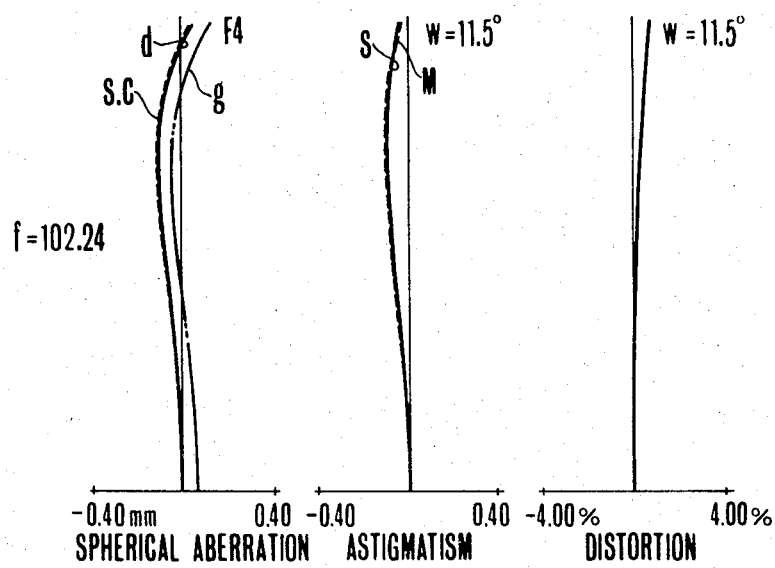
Figures 10D, 10E, 10F:
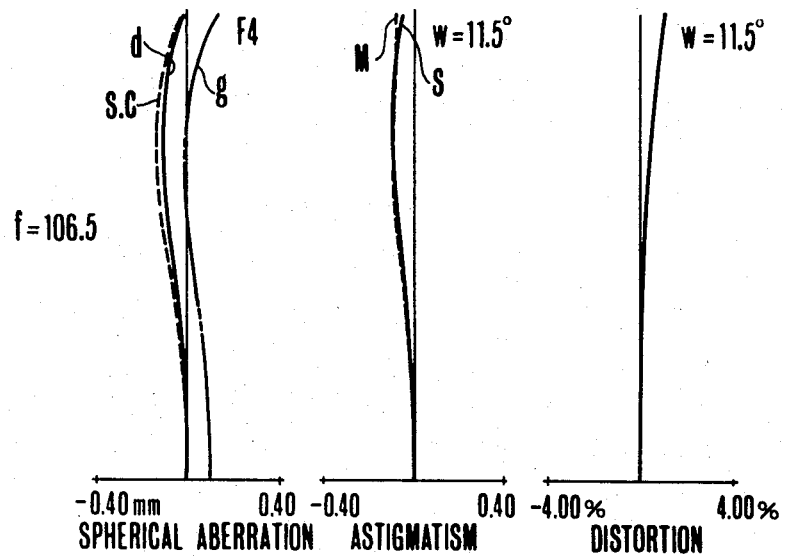
Figures 10G, 10H, 10I:
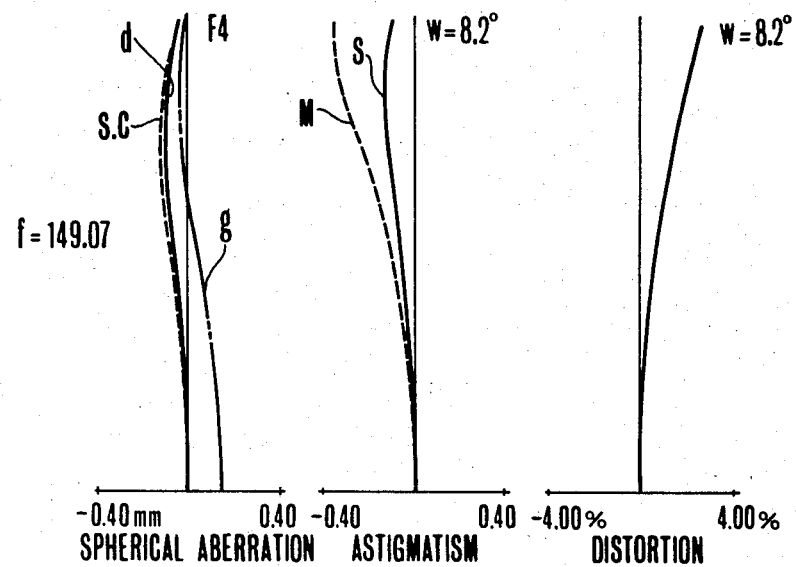
Figures 11A, 11B, 11C:
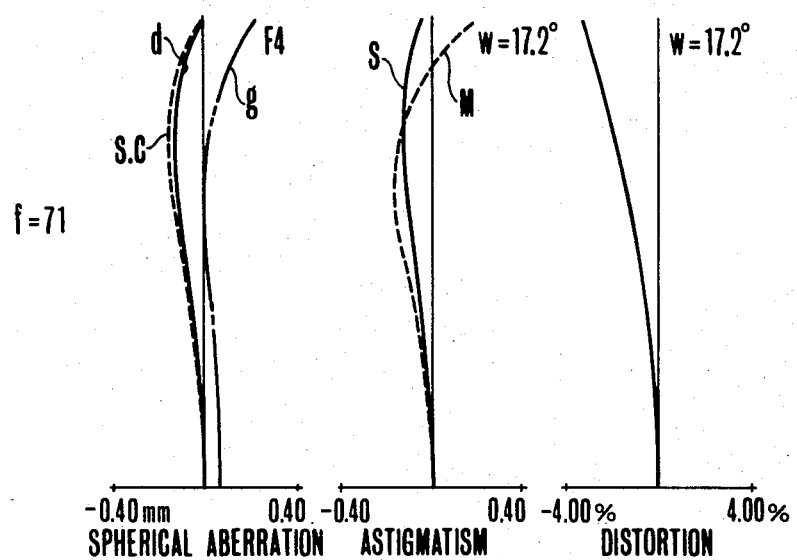
Figures 11D, 11E, 11F:
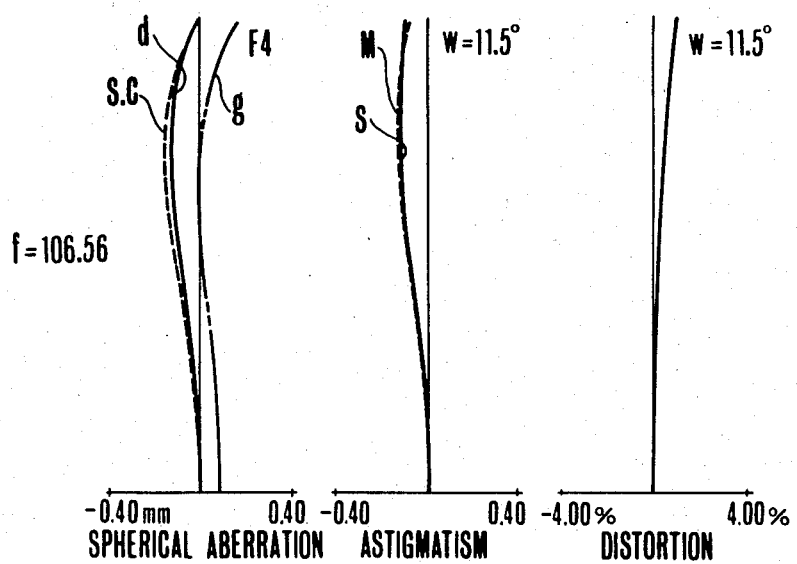
Figures 11G, 11H, 11I:
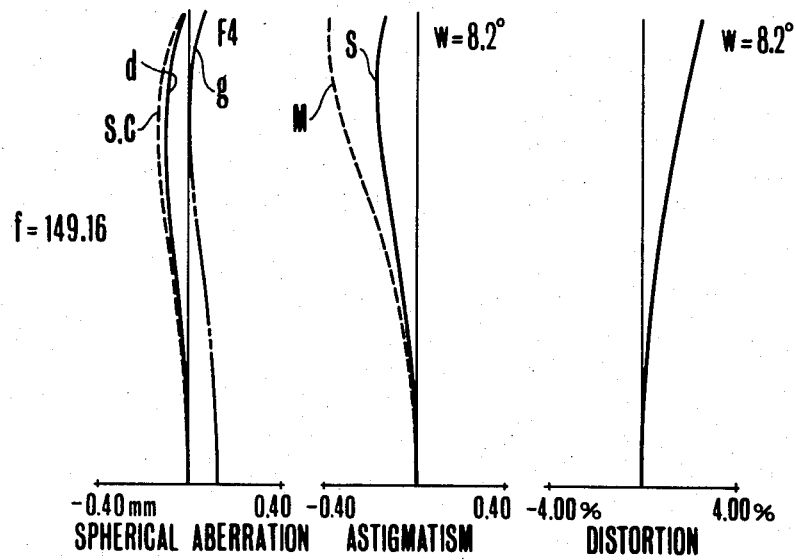
Figures 12A, 12B, 12C:
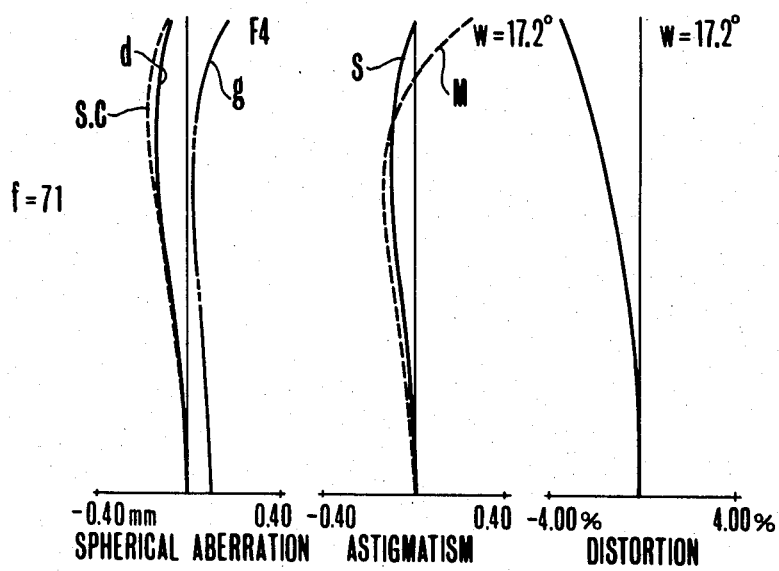
Figures 12D, 12E, 12F:
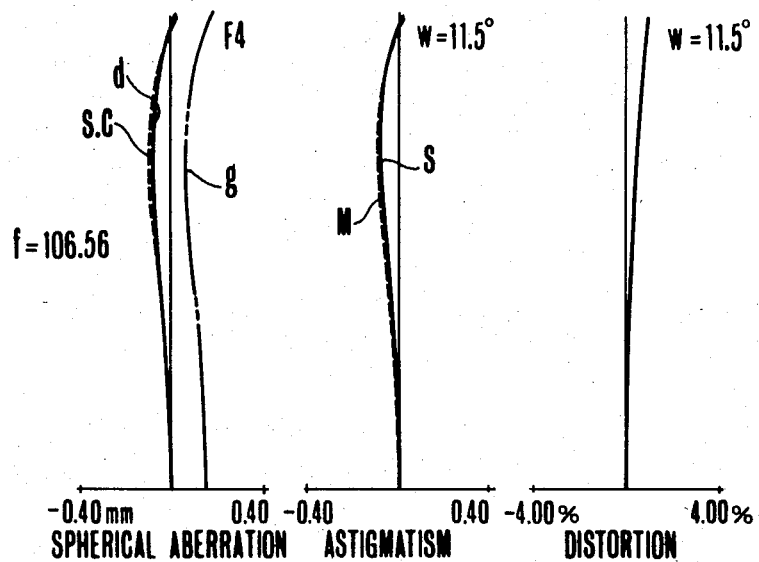
Figures 12G, 12H, 12I:
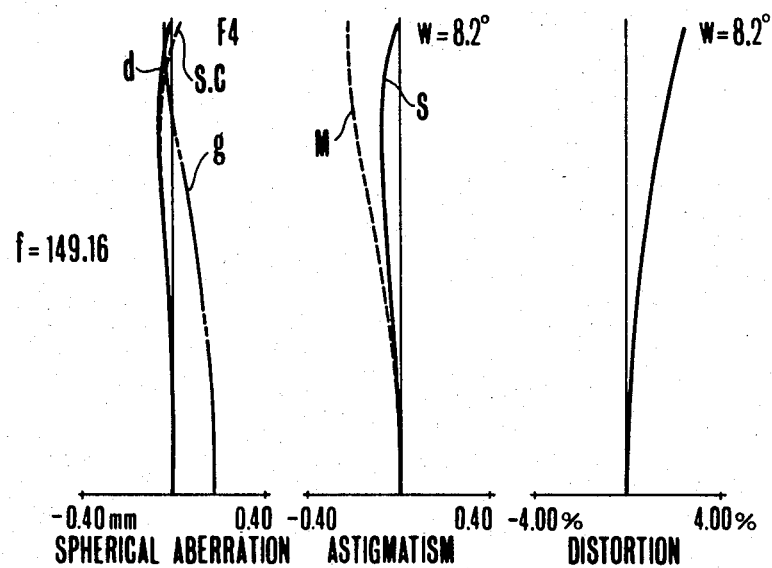
Figures 13A, 13B, 13C:
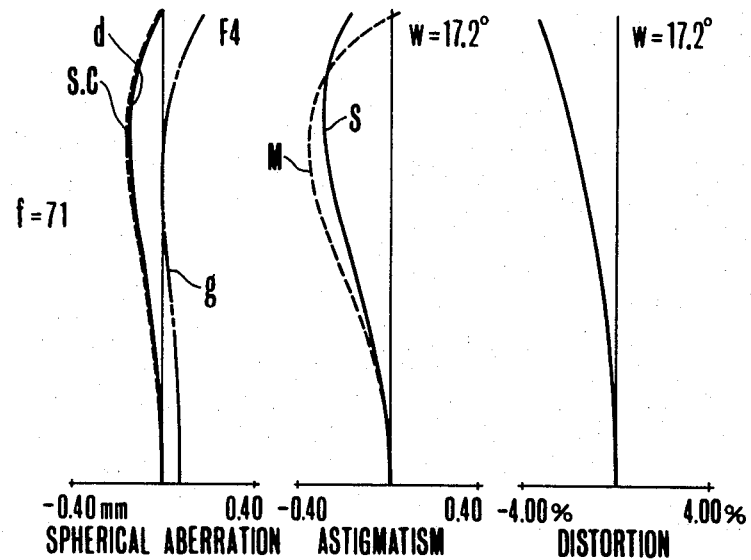
Figures 13D, 13E, 13F:
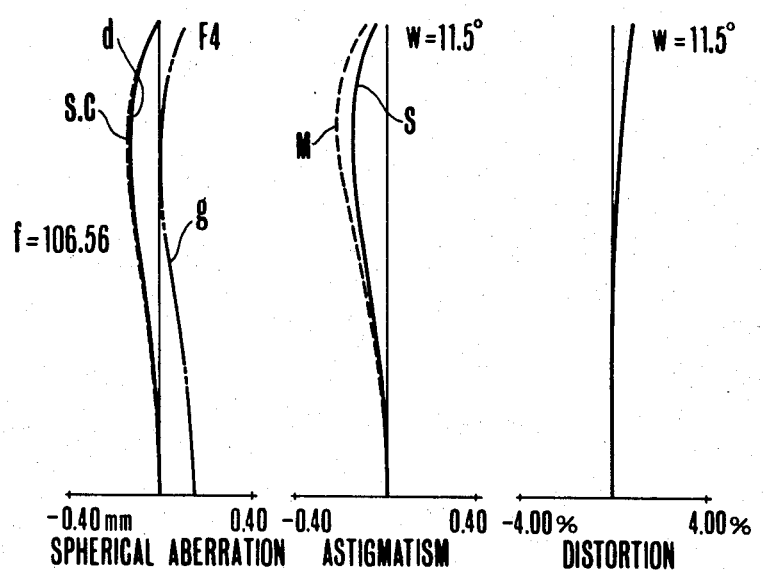
Figures 13G, 13H, 13I:
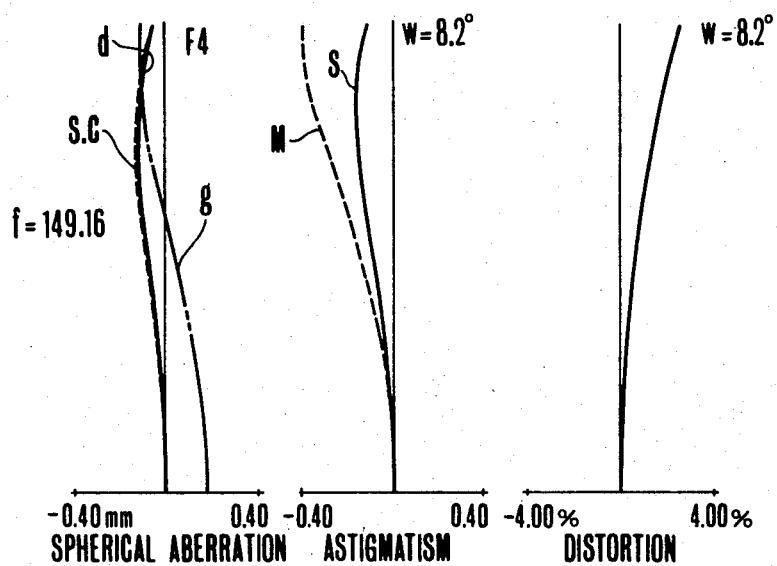
Figures 14A, 14B, 14C:
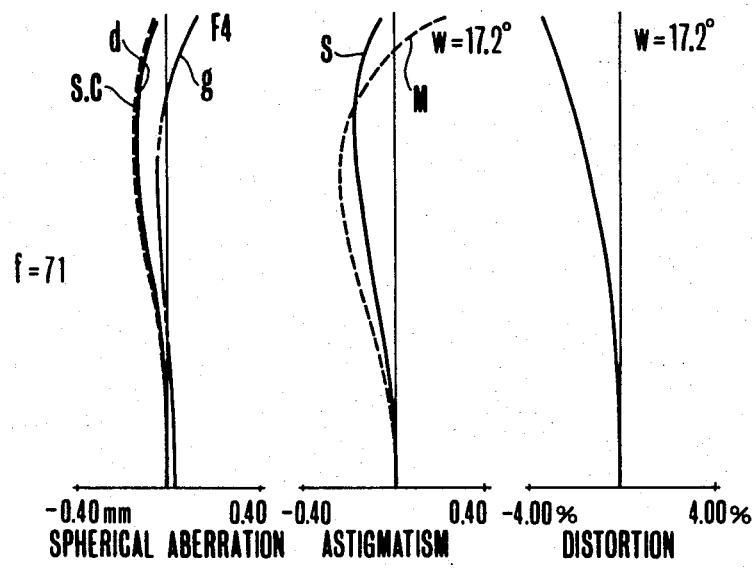
Figures 14D, 14E, 14F:
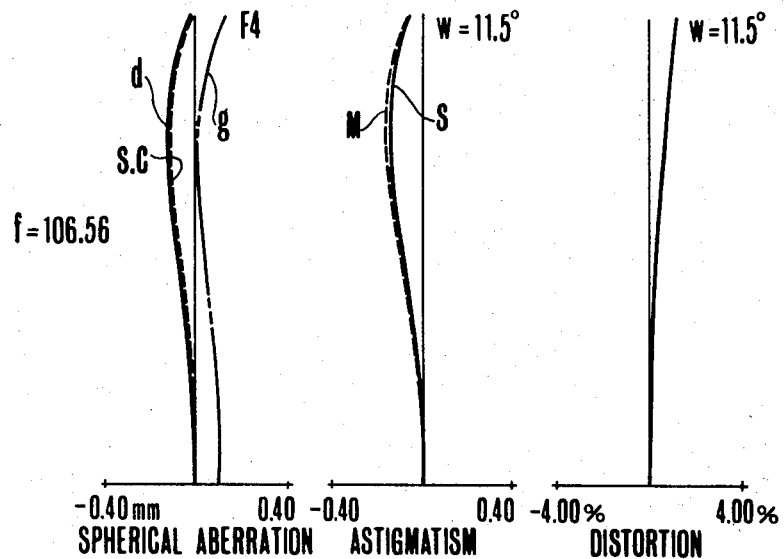
Figures 14G, 14H, 14I:
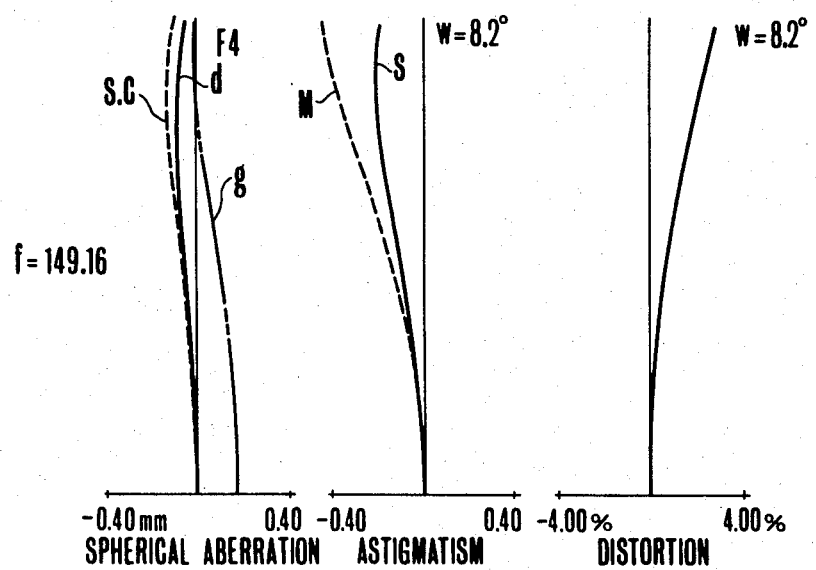
Figures 15A, 15B, 15C:
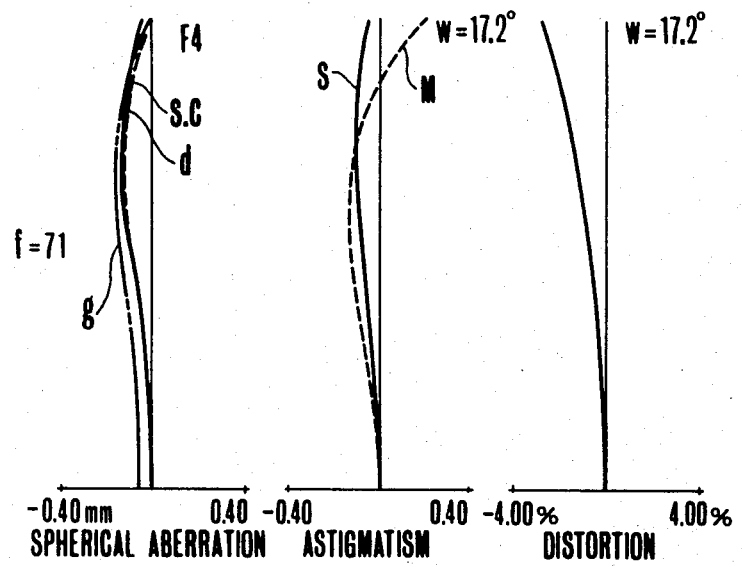
Figures 15D, 15E, 15F:
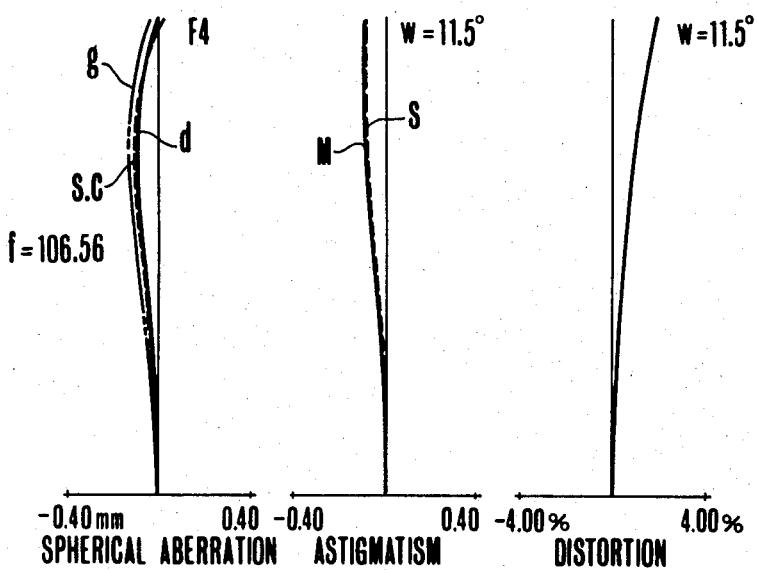
Figures 15G, 15H, 15I:
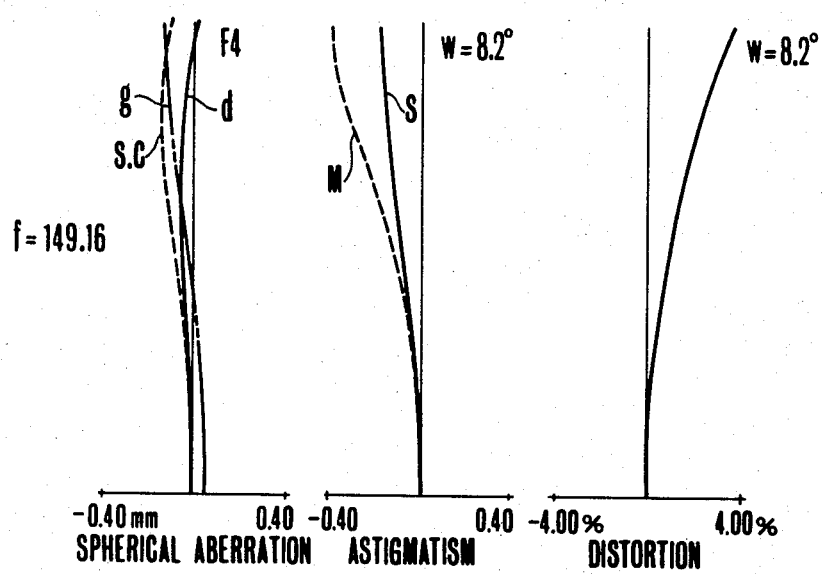
Figures 16A, 16B, 16C:
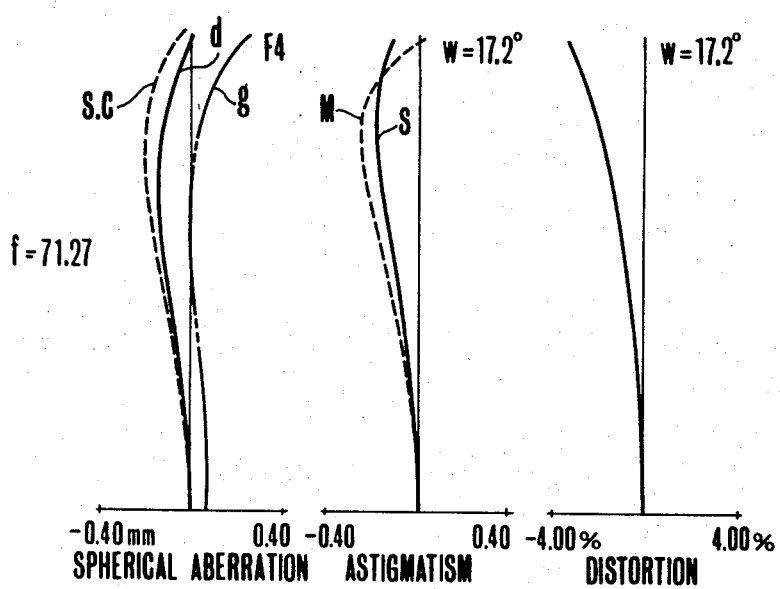
Figures 16D, 16E, 16F:
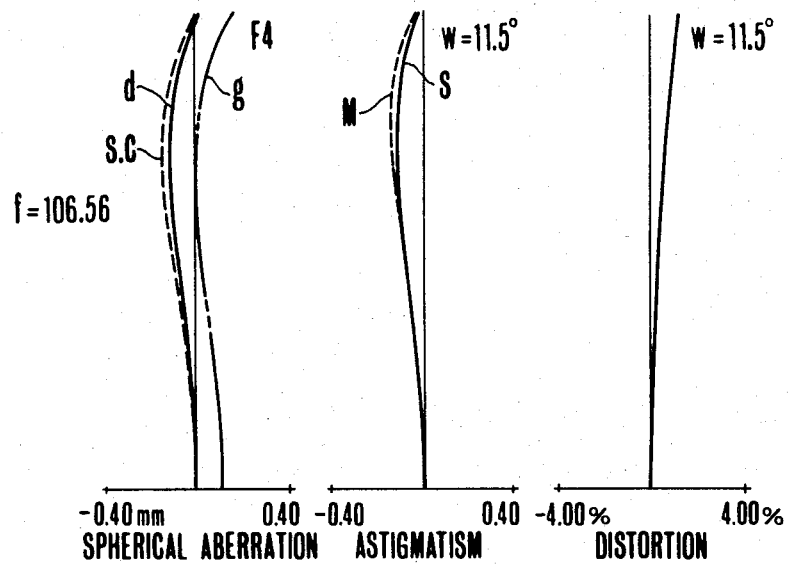
Figures 16G, 16H, 16I:
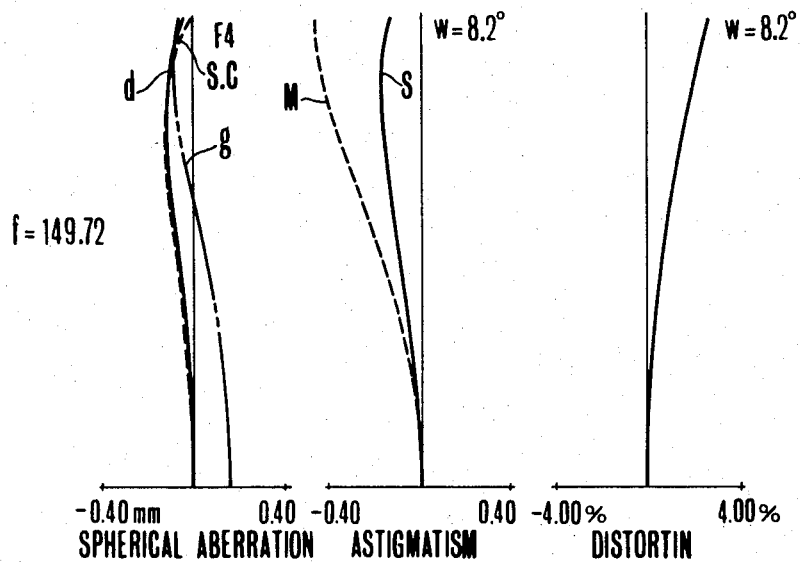

The zoom objective that accomplishes the object of the present invention comprises two lens parts, from front to rear, a varifocal part and a fixed part, the aforesaid varifocal part having a 1st group of positive power movable for focusing, a 2nd group of negative power movable for varying the image magnification, and a 3rd group of positive power movable for the image shift compensation, the fixed part has a 4th group of positive power which consists of, from front to rear, two positive lenses of strong convex curvature towards the front and a negative lens, and a 5th group of negative power which consists of a negative meniscus lens of rearward convexity and a positive lens.

It is noted that the image shift compensating provision may be made at the 1st group without the use of the 3rd group.

In the present invention, to further facilitate an achievement of good correction of aberrations, letting $f_4$ denote the focal length of the 4th group, $f_5$ the focal length of the 5th group, $f_R$ the overall focal length of the 4th and 5th groups, D17 the axial air separation between the rear positive lens and the negative lens in the 4th group, $f_{41}$ the focal length of the front positive lens in the 4th group, R14 and R15 the radii of curvature of the front and rear surfaces of the front positive lens in the 4th group respectively, and R18 and R19 the radii of curvature of the front and rear surfaces of the negative lens in the 4th group respectively, the following conditions are set forth:

$$0.7 < \frac{f_4}{f_R} < 1.0 \tag{1}$$

-continued $$1.0 < \left| \frac{f_5}{f_R} \right| < 3.9 \frac{f_5}{f_R} < 0 \quad (2)$$

$$0.006 < \frac{D17}{f_R} < 0.05 \quad (3)$$

$$1.0 < \frac{f_{41}}{f_4} < 1.5 \quad (4)$$

$$1.5 < \left| \frac{R14 + R15}{R14 - R15} \right| < 2.6, \frac{R14 + R15}{R14 - R15} < 0 \quad (5)$$

$$1.4 < \frac{R18 + R19}{R18 - R19} < 4.5 \quad (6)$$

Each of the above conditions is explained below.

Conditions (1) and (2) concerns a power distribution over the front group (4th group) and the rear group (5th group) in the fixed lens part which represents the telephoto design of the fixed part, for the total length of the lens system is shortened.

The upper limit of condition (1) is for making small the telephoto ratio of the fixed part itself. When the upper limit is exceeded, though the aberrational problem becomes easier, a loss in the compactness results. On the other hand, when the lower limit is exceeded, the Petzval sum increases in a negative sense, and correction of field curvature becomes difficult.

Condition (2) is similarly for making small the telephoto ratio of the fixed part itself. When the upper limit is exceeded, the bulk and size of the lens system is greatly increased. When the lower limit is exceeded, as the concavity of the negative meniscus lens in the 5th group toward the rear becomes intensified, correction of coma becomes difficult.

Condition (3) defines the range of axial air separation between the rear positive lens and the negative lens in the 4th group and constitutes an important feature of the present invention in connection with condition (6). That is, condition (3) is, upon positioning of the negative lens in a relatively short distance from the two positive lenses in the 4th group for weakening the refractive power of the negative lens, thereby correction of the various aberrations is made easy. When the upper limit of condition (3) is exceeded, as the negative lens has a strong refractive power, spherical aberration and field curvature are over-corrected. The lower limit represents the value for avoidance of mechanical interference of the lenses with each other.

Condition (4) defines the range of focal lengths of the front positive lens in the 4th group, and cooperates with condition (5) in respect of correcting spherical aberration and coma. When the upper limit is exceeded, under-correction of spherical aberration results. When the lower limit is exceeded, inward coma is produced. Condition (5) represents the configuration of the front and rear surfaces of the above-mentioned positive lens and is the so-called shape factor indicating that, as the upper limit is approached, the meniscus degree is strengthened. When the upper limit of condition (5) is exceeded, it becomes difficult for the spherical aberration produced from the rear surface of the above-mentioned positive lens to remove the under-corrected spherical aberration in the image plane. On the other hand, when the lower limit is exceeded, it becomes difficult for the coma produced from the rear surface of the above-mentioned positive lens to remove the inward coma in the image plane.

Condition (6) represents the configuration of the front and rear surfaces of the negative lens in the 4th group and is in connection with condition (3) to assist in decreasing the telephoto ratio, while still permitting good correction of aberrations. When the upper limit is exceeded, under-correction of spherical aberration results. On the other hand, when the lower limit is exceeded, the inward coma is objectionably increased.

As has been described above, the present invention contemplates the use of the above-described type zoom lens design in combination with the conditions (1) to (6) given to its fixed lens part in achieving the possibility of realising a compact zoom objective which is well corrected for aberrations.

Eight examples of specific objectives of the invention can be constructed in accordance with the numerical data given in the following tables for the radius of curvature, Ri, of the i-th surface counting from the front, the axial thickness or air separation, Di, between the i-th and the (i+1)th surfaces, and the refractive index, Ni, and the Abbe number, i, of the glass of the i-th lens element counting from the front.

It is noted that the image shift compensation is effected by the 3rd group in Examples 1 to 7, and by the 1st group of focusing in Example 8.

In the lens block diagrams of the objectives described above, I designates the 1st group, II the 2nd group, III the 3rd group, IV the 4th group, V the 5th group, Ri the lens surface numbered from the front, Di the lens surface separation numbered. In the graphs of the aberration curves of the objectives, S designates the sagittal image surface, and M the meridional image surface.

EXAMPLE 1

| | | F = 71.0–149.1 | | FNO = 1:4.0 | | $2\omega$ 34.4°–16.4° | |
|---|---|---|---|---|---|---|---|
| I | R1 = 73.99 | D1 = 2.40 | N1 = 1.84666 | $\nu$1 = 23.9 |
| | R2 = 45.80 | D2 = 7.00 | N2 = 1.61117 | $\nu$2 = 55.9 |
| | R3 = −916.83 | D3 = 0.15 | | |
| | R4 = 91.45 | D4 = 4.00 | N3 = 1.54771 | $\nu$3 = 62.9 |
| | R5 = 611.60 | D5 = Variable | | |
| II | R6 = −212.28 | D6 = 1.50 | N4 = 1.77250 | $\nu$4 = 49.6 |
| | R7 = 35.90 | D7 = 4.69 | | |
| | R8 = −41.94 | D8 = 1.50 | N5 = 1.61484 | $\nu$5 = 51.2 |
| | R9 = 40.68 | D9 = 3.30 | N6 = 1.84666 | $\nu$6 = 23.9 |
| | R10 = −603.21 | D10 = Variable | | |
| III | R11 = 110.53 | D11 = 5.10 | N7 = 1.54739 | $\nu$7 = 53.6 |
| | R12 = −27.63 | D12 = 1.50 | N8 = 1.80518 | $\nu$8 = 25.4 |
| | R13 = −49.24 | D13 = Variable | | |
| IV | R14 = 35.84 | D14 = 4.00 | N9 = 1.48749 | $\nu$9 = 70.1 |
| | R15 = 132.29 | D15 = 0.15 | | |
| | R16 = 40.36 | D16 = 2.50 | N10 = 1.49831 | $\nu$10 = 65.0 |
| | R17 = 78.92 | D17 = 0.70 | | |

-continued

| | | F = 71.0–149.1 | | FNO = 1:4.0 | | 2ω 34.4°–16.4° | | |
|---|---|---|---|---|---|---|---|---|
| | R18 | = 109.87 | D18 | = 1.60 | N11 | = 1.80518 | ν11 | = 25.4 |
| | R19 | = 68.63 | D19 | = 42.92 | | | | |
| | R20 | = −18.77 | D20 | = 1.60 | N12 | = 1.71700 | ν12 | = 47.3 |
| | R21 | = −37.74 | D21 | = 0.15 | | | | |
| V | R22 | = 99.87 | D22 | = 3.30 | N13 | = 1.58875 | ν13 | = 51.2 |
| | R23 | = −95.85 | | | | | | |

| | f | | |
|---|---|---|---|
| Di | 71.00 | 102.24 | 149.10 |
| D5 | 2.05 | 15.47 | 25.06 |
| D10 | 23.63 | 14.61 | 1.08 |
| D13 | 7.41 | 3.01 | 6.95 |

EXAMPLE 2

| | | F = 70.96–149.07 | | FNO = 1:4 | | 2ω = 34.4°–16.4° | | |
|---|---|---|---|---|---|---|---|---|
| | R1 | = 92.29 | D1 | = 2.40 | N1 | = 1.80518 | ν1 | = 25.4 |
| | R2 | = 54.80 | D2 | = 7.03 | N2 | = 1.60311 | ν2 | = 60.7 |
| I | R3 | = −1926.63 | D3 | = 0.15 | | | | |
| | R4 | = 110.50 | D4 | = 3.50 | N3 | = 1.51633 | ν3 | = 64.1 |
| | R5 | = 2461.28 | D5 | = Variable | | | | |
| | R6 | = −224.30 | D6 | = 1.50 | N4 | = 1.72000 | ν4 | = 50.2 |
| | R7 | = 42.63 | D7 | = 3.62 | | | | |
| II | R8 | = −49.27 | D8 | = 1.50 | N5 | = 1.63854 | ν5 | = 55.4 |
| | R9 | = 42.79 | D9 | = 3.30 | N6 | = 1.80518 | ν6 | = 25.4 |
| | R10 | = −468.54 | D10 | = Variable | | | | |
| | R11 | = 117.14 | D11 | = 5.10 | N7 | = 1.50137 | ν7 | = 56.4 |
| III | R12 | = −31.43 | D12 | = 1.50 | N8 | = 1.80518 | ν8 | = 25.4 |
| | R13 | = −51.46 | D13 | = Variable | | | | |
| | R14 | = 30.33 | D14 | = 4.00 | N9 | = 1.49831 | ν9 | = 65.0 |
| | R15 | = 146.51 | D15 | = 0.15 | | | | |
| | R16 | = 36.72 | D16 | = 2.60 | N10 | = 1.49831 | ν10 | = 65.0 |
| IV | R17 | = 74.61 | D17 | = 0.74 | | | | |
| | R18 | = 242.37 | D18 | = 1.60 | N11 | = 1.80518 | ν11 | = 25.4 |
| | R19 | = 76.89 | D19 | = 37.73 | | | | |
| | R20 | = −16.65 | D20 | = 1.60 | N12 | = 1.66672 | ν12 | = 48.3 |
| | R21 | = −36.67 | D21 | = 0.15 | | | | |
| V | R22 | = 99.32 | D22 | = 3.30 | N13 | = 1.59551 | ν13 | = 39.2 |
| | R23 | = −99.32 | | | | | | |

| | f | | |
|---|---|---|---|
| Di | 70.96 | 106.50 | 149.07 |
| D5 | 1.76 | 20.98 | 32.10 |
| D10 | 25.68 | 14.64 | 1.24 |
| D13 | 11.27 | 3.09 | 5.38 |

EXAMPLE 3

| | | F = 70.–149.16 | | FNO = 1:4 | | 2ω = 34.4°–16.4° | | |
|---|---|---|---|---|---|---|---|---|
| | R1 | = 97.98 | D1 | = 2.40 | N1 | = 1.80518 | ν1 | = 25.4 |
| | R2 | = 57.81 | D2 | = 7.03 | N2 | = 1.60311 | ν2 | = 60.7 |
| I | R3 | = −1549.25 | D3 | = 0.15 | | | | |
| | R4 | = 116.10 | D4 | = 3.50 | N3 | = 1.51633 | ν3 | = 64.1 |
| | R5 | = 3437.50 | D5 | = Variable | | | | |
| | R6 | = −329.59 | D6 | = 1.50 | N4 | = 1.72000 | ν4 | = 50.2 |
| | R7 | = 45.94 | D7 | = 4.62 | | | | |
| II | R8 | = −51.74 | D8 | = 1.50 | N5 | = 1.63854 | ν5 | = 55.4 |
| | R9 | = 48.68 | D9 | = 3.30 | N6 | = 1.80518 | ν6 | = 25.4 |
| | R10 | = −380.86 | D10 | = Variable | | | | |
| | R11 | = 140.44 | D11 | = 5.10 | N7 | = 1.50137 | ν7 | = 56.4 |
| III | R12 | = −33.42 | D12 | = 1.50 | N8 | = 1.80518 | ν8 | = 25.4 |
| | R13 | = −54.65 | D13 | = Variable | | | | |
| | R14 | = 30.35 | D14 | = 4.00 | N9 | = 1.49831 | ν9 | = 65.0 |
| | R15 | = 99.94 | D15 | = 0.15 | | | | |
| | R16 | = 34.13 | D16 | = 2.60 | N10 | = 1.49831 | ν10 | = 65.0 |
| IV | R17 | = 70.93 | D17 | = 0.79 | | | | |
| | R18 | = 156.07 | D18 | = 1.60 | N11 | = 1.80518 | ν11 | = 25.4 |
| | R19 | = 67.30 | D19 | = 37.93 | | | | |
| | R20 | = −16.63 | D20 | = 1.60 | N12 | = 1.66672 | ν12 | = 48.3 |
| | R21 | = −37.23 | D21 | = 0.15 | | | | |
| V | R22 | = 96.41 | D22 | = 3.30 | N13 | = 1.59551 | ν13 | = 39.2 |
| | R23 | = −103.32 | | | | | | |

| | f | | |
|---|---|---|---|
| Di | 71.00 | 106.56 | 149.16 |

-continued

| | F = 70.-149.16 | FNO = 1:4 | 2ω = 34.4°-16.4° |
|---|---|---|---|
| D5 | 1.48 | 21.02 | 32.16 |
| D10 | 31.25 | 17.56 | 1.16 |
| D13 | 8.88 | 3.02 | 8.28 |

EXAMPLE 4

| | | F = 71.0-149.16 | | FNO = 1:4 | | 2ω = 34.4°-16.1° | | |
|---|---|---|---|---|---|---|---|---|
| I | R1 = 120.96 | D1 = 3.50 | N1 = 1.53113 | ν1 = 62.4 |
| | R2 = −1101.36 | D2 = 0.15 | | |
| | R3 = 92.29 | D3 = 2.00 | N2 = 1.80518 | ν2 = 25.4 |
| | R4 = 53.74 | D4 = 5.80 | N3 = 1.64250 | ν3 = 58.4 |
| | R5 = 635.68 | D5 = Variable | | |
| II | R6 = −189.11 | D6 = 1.50 | N4 = 1.69680 | ν4 = 55.5 |
| | R7 = 40.83 | D7 = 4.46 | | |
| | R8 = −49.76 | D8 = 1.50 | N5 = 1.51633 | ν5 = 64.1 |
| | R9 = 45.43 | D9 = 3.30 | N6 = 1.80518 | ν6 = 25.4 |
| | R10 = 341.04 | D10 = Variable | | |
| III | R11 = 123.52 | D11 = 5.10 | N7 = 1.50137 | ν7 = 56.4 |
| | R12 = −30.68 | D12 = 1.50 | N8 = 1.80518 | ν8 = 25.4 |
| | R13 = −50.03 | D13 = Variable | | |
| IV | R14 = 31.46 | D14 = 3.80 | N9 = 1.49831 | ν9 = 65.0 |
| | R15 = 156.08 | D15 = 0.15 | | |
| | R16 = 39.71 | D16 = 2.50 | N10 = 1.49831 | ν10 = 65.0 |
| | R17 = 78.70 | D17 = 1.72 | | |
| | R18 = 246.09 | D18 = 1.50 | N11 = 1.80518 | ν11 = 25.4 |
| | R19 = 79.68 | D19 = 38.64 | | |
| V | R20 = −17.49 | D20 = 1.60 | N12 = 1.66672 | ν12 = 48.3 |
| | R21 = −35.84 | D21 = 0.15 | | |
| | R22 = 98.50 | D22 = 3.30 | N13 = 1.59551 | ν13 = 39.2 |
| | R23 = −99.39 | | | |

| | | f | |
|---|---|---|---|
| Di | 71.00 | 106.56 | 149.16 |
| D5 | 1.76 | 20.98 | 32.09 |
| D10 | 25.13 | 14.09 | 0.69 |
| D13 | 11.27 | 3.09 | 5.38 |

EXAMPLE 5

| | | F = 71.-149.16 | | FNO = 1:4 | | 2ω = 34.4°-16.4° | | |
|---|---|---|---|---|---|---|---|---|
| I | R1 = 134.51 | D1 = 3.50 | N1 = 1.53113 | ν1 = 62.4 |
| | R2 = −1799.77 | D2 = 0.15 | | |
| | R3 = 88.29 | D3 = 2.40 | N2 = 1.80518 | ν2 = 25.4 |
| | R4 = 52.93 | D4 = 6.50 | N3 = 1.61800 | ν3 = 63.4 |
| | R5 = 917.45 | D5 = Variable | | |
| II | R6 = 364.88 | D6 = 4.20 | N4 = 1.80518 | ν4 = 25.4 |
| | R7 = −49.60 | D7 = 1.50 | N5 = 1.64250 | ν5 = 58.4 |
| | R8 = 42.10 | D8 = 3.16 | | |
| | R9 = −42.38 | D9 = 1.50 | N6 = 1.71300 | ν6 = 53.8 |
| | R10 = 760.43 | D10 = Variable | | |
| III | R11 = 205.76 | D11 = 5.10 | N7 = 1.54771 | ν7 = 62.9 |
| | R12 = −32.28 | D12 = 1.50 | N8 = 1.80518 | ν8 = 25.4 |
| | R13 = −50.70 | D13 = Variable | | |
| IV | R14 = 30.19 | D14 = 3.30 | N9 = 1.54771 | ν9 = 62.9 |
| | R15 = 73.78 | D15 = 0.15 | | |
| | R16 = 34.08 | D16 = 2.40 | N10 = 1.51633 | ν10 = 64.1 |
| | R17 = 78.31 | D17 = 4.23 | | |
| | R18 = 423.61 | D18 = 1.94 | N11 = 1.80518 | ν11 = 25.4 |
| | R19 = 78.97 | D19 = 33.58 | | |
| V | R20 = −16.59 | D20 = 1.60 | N12 = 1.61340 | ν12 = 43.8 |
| | R21 = −30.56 | D21 = 0.15 | | |
| | R22 = 91.00 | D22 = 3.30 | N13 = 1.67270 | ν13 = 32.1 |
| | R23 = −127.25 | | | |

| | | f | |
|---|---|---|---|
| Di | 71.00 | 106.56 | 149.16 |
| D5 | 1.65 | 20.86 | 31.98 |
| D10 | 26.47 | 15.44 | 2.03 |
| D13 | 11.27 | 3.09 | 5.38 |

EXAMPLE 6

| | | F = 71.0–149.16 | | FNO = 1:4 | | 2ω = 34.4°–16.1° | | |
|---|---|---|---|---|---|---|---|---|
| I | R1 = 120.38 | D1 = 2.40 | N1 = 1.80518 | $\nu$1 = 25.4 |
| | R2 = 64.11 | D2 = 6.33 | N2 = 1.60311 | $\nu$2 = 60.7 |
| | R3 = −3415.78 | D3 = 0.15 | | |
| | R4 = 95.36 | D4 = 3.50 | N3 = 1.51633 | $\nu$3 = 64.1 |
| | R5 = −1433.03 | D5 = Variable | | |
| II | R6 = −169.29 | D6 = 3.30 | N4 = 1.84666 | $\nu$4 = 23.9 |
| | R7 = −45.63 | D7 = 1.50 | N5 = 1.51633 | $\nu$5 = 64.1 |
| | R8 = 47.12 | D8 = 3.15 | | |
| | R9 = −41.79 | D9 = 1.50 | N6 = 1.64250 | $\nu$6 = 58.4 |
| | R10 = 215.27 | D10 = Variable | | |
| III | R11 = 150.99 | D11 = 5.10 | N7 = 1.50137 | $\nu$7 = 56.4 |
| | R12 = −27.02 | D12 = 1.50 | N8 = 1.80518 | $\nu$8 = 25.4 |
| | R13 = −43.37 | D13 = Variable | | |
| IV | R14 = 30.67 | D14 = 3.50 | N9 = 1.49831 | $\nu$9 = 65.0 |
| | R15 = 69.77 | D15 = 0.15 | | |
| | R16 = 36.01 | D16 = 2.30 | N10 = 1.49831 | $\nu$10 = 65.0 |
| | R17 = 101.37 | D17 = 0.71 | | |
| | R18 = 194.08 | D18 = 1.60 | N11 = 1.80518 | $\nu$11 = 25.4 |
| | R19 = 86.63 | D19 = 37.85 | | |
| V | R20 = −16.97 | D20 = 1.60 | N12 = 1.66672 | $\nu$12 = 48.3 |
| | R21 = −27.90 | D21 = 0.15 | | |
| | R22 = 64.08 | D22 = 3.30 | N13 = 1.59551 | $\nu$13 = 39.2 |
| | R23 = 834.12 | | | |

| | f | | |
|---|---|---|---|
| Di | 71.00 | 106.56 | 149.16 |
| D5 | 3.30 | 22.50 | 33.62 |
| D10 | 24.92 | 13.89 | 0.49 |
| D13 | 11.27 | 3.09 | 5.36 |

EXAMPLE 7

| | | F = 71.0–149.16 | | FNO = 1:4.0 | | 2ω = 34.4°–16.1° | | |
|---|---|---|---|---|---|---|---|---|
| I | R1 = 79.25 | D1 = 2.40 | N1 = 1.80518 | $\nu$1 = 25.4 |
| | R2 = 48.51 | D2 = 7.03 | N2 = 1.60311 | $\nu$2 = 60.7 |
| | R3 = 3483.41 | D3 = 0.15 | | |
| | R4 = 123.65 | D4 = 3.50 | N3 = 1.51633 | $\nu$3 = 64.1 |
| | R5 = 2492.65 | D5 = Variable | | |
| II | R6 = −129.96 | D6 = 1.50 | N4 = 1.72000 | $\nu$4 = 50.2 |
| | R7 = 45.85 | D7 = 2.70 | | |
| | R8 = −53.47 | D8 = 1.50 | N5 = 1.63854 | $\nu$5 = 55.4 |
| | R9 = 39.32 | D9 = 3.30 | N6 = 1.80518 | $\nu$6 = 25.4 |
| | R10 = −580.02 | D10 = Variable | | |
| III | R11 = 113.26 | D11 = 5.10 | N7 = 1.50137 | $\nu$7 = 56.4 |
| | R12 = −29.21 | D12 = 1.50 | N8 = 1.80518 | $\nu$8 = 25.4 |
| | R13 = −49.62 | D13 = Variable | | |
| IV | R14 = 33.94 | D14 = 4.00 | N9 = 1.48749 | $\nu$9 = 70.1 |
| | R15 = 115.37 | D15 = 0.15 | | |
| | R16 = 41.25 | D16 = 2.60 | N10 = 1.48749 | $\nu$10 = 70.1 |
| | R17 = 70.98 | D17 = 0.74 | | |
| | R18 = 191.63 | D18 = 1.60 | N11 = 1.80518 | $\nu$11 = 25.4 |
| | R19 = 90.32 | D19 = 20.86 | | |
| V | R20 = 105.08 | D20 = 3.30 | N12 = 1.51118 | $\nu$12 = 51.0 |
| | R21 = −127.65 | D21 = 13.73 | | |
| | R22 = −20.80 | D22 = 2.00 | N13 = 1.63854 | $\nu$13 = 55.4 |
| | R23 = −44.53 | | | |

| | f | | |
|---|---|---|---|
| Di | 71.00 | 106.56 | 149.16 |
| D5 | 1.51 | 20.73 | 31.84 |
| D10 | 26.19 | 15.15 | 1.75 |
| D13 | 11.27 | 3.09 | 5.38 |

EXAMPLE 8

| | | F = 71.27–149.72 | | FNO = 1:4.0 | | 2ω = 34.4°–16.1° | | |
|---|---|---|---|---|---|---|---|---|
| I | R1 = 109.98 | D1 = 2.40 | N1 = 1.80518 | $\nu$1 = 25.4 |
| | R2 = 61.22 | D2 = 7.03 | N2 = 1.60311 | $\nu$2 = 60.7 |
| | R3 = −640.17 | D3 = 0.15 | | |
| | R4 = 101.81 | D4 = 3.50 | N3 = 1.51633 | $\nu$3 = 64.1 |
| | R5 = 2429.94 | D5 = Variable | | |
| II | R6 = −230.50 | D6 = 1.50 | N4 = 1.72000 | $\nu$4 = 50.2 |
| | R7 = 42.73 | D7 = 4.29 | | |
| | R8 = −52.59 | D8 = 1.50 | N5 = 1.63854 | $\nu$5 = 55.4 |

-continued

| | | F = 71.27–149.72 | | FNO = 1:4.0 | | 2ω = 34.4°–16.1° | | |
|---|---|---|---|---|---|---|---|---|
| | R9 | = 41.39 | D9 | = 3.30 | N6 | = 1.80518 | ν6 | = 25.4 |
| | R10 | = −990.20 | D10 | = Variable | | | | |
| III | R11 | = 103.62 | D11 | = 5.10 | N7 | = 1.50137 | ν7 | = 56.4 |
| | R12 | = −33.16 | D12 | = 1.50 | N8 | = 1.80518 | ν8 | = 25.4 |
| | R13 | = −55.14 | D13 | = 1.59 | | | | |
| | R14 | = 31.44 | D14 | = 4.00 | N9 | = 1.49831 | ν9 | = 65.0 |
| | R15 | = 150.80 | D15 | = 0.15 | | | | |
| IV | R16 | = 35.76 | D16 | = 2.60 | N10 | = 1.49831 | ν10 | = 65.0 |
| | R17 | = 76.09 | D17 | = 1.38 | | | | |
| | R18 | = 302.74 | D18 | = 1.60 | N11 | = 1.80518 | ν11 | = 25.4 |
| | R19 | = 78.40 | D19 | = 38.91 | | | | |
| | R20 | = −16.54 | D20 | = 1.60 | N12 | = 1.66672 | ν12 | = 48.3 |
| | R21 | = −36.96 | D21 | = 0.15 | | | | |
| V | R22 | = 81.47 | D22 | = 3.30 | N13 | = 1.59551 | ν13 | = 39.2 |
| | R23 | = −103.55 | | | | | | |

| | | f | |
|---|---|---|---|
| Di | 71.27 | 106.96 | 149.72 |
| D5 | 2.16 | 21.53 | 32.57 |
| D10 | 25.58 | 14.39 | 1.00 |

What is claimed is:

1. A telephoto zoom objective having the following various conditions:
   having five lens groups, from front to rear,
   the 1st lens group having a positive refractive power and being movable for focusing,
   the 2nd group having a negative refractive power and being movable for varying magnification,
   the 3rd group having a positive refractive power and being movable for compensating for the image shift caused when changing the image magnification,
   the 4th group being fixed and having, from front to rear, two lenses of positive refractive power convex towards the front and a lens of negative power, and
   the 5th group being fixed and having a meniscus lens of negative power convex towards the rear and a lens of positive power, and wherein letting f4 denote the focal length of the aforesaid 4th group, f5 the focal length of the aforesaid 5th group, $f_R$ the overall focal length of the aforesaid 4th and the aforesaid 5th groups, D17 the axial air separation between the rear side lens of positive power and the lens of negative power in the aforesaid 4th group, f41 the focal length of the front side lens of positive power in the aforesaid 4th group, R14 and R15 the radii of curvature of the front and rear surfaces of the same lens respectively, and R18 and R19 the radii of curvature of the front and rear surfaces of the lens of negative power in the aforesaid 4th group, the following conditions are satisfied:

$$0.7 < \frac{f4}{f_R} < 1.0$$

$$1.0 < \left|\frac{f5}{f_R}\right| < 3.9, \frac{f5}{f_R} < 0$$

$$0.006 < \frac{D17}{f_R} < 0.05$$

$$1.0 < \frac{f41}{f4} < 1.5$$

$$1.5 < \left|\frac{R14 + R15}{R14 - R15}\right| < 2.6, \frac{R14 + R15}{R14 - R15} < 0$$

$$1.4 < \frac{R18 + R19}{R18 - R19} < 4.5$$

2. A telephoto zoom objective according to claim 1, wherein the image shift caused when changing the image magnification is compensated for by making the aforesaid 1st group to move.

* * * * *